United States Patent
Nagano et al.

(10) Patent No.: US 6,540,035 B2
(45) Date of Patent: Apr. 1, 2003

(54) HYBRID VEHICLE

(75) Inventors: Shuji Nagano, Toyota (JP); Kunio Morisawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/522,365

(22) Filed: Mar. 9, 2000

(65) Prior Publication Data

US 2002/0007974 A1 Jan. 24, 2002

Related U.S. Application Data

(63) Continuation of application No. 08/845,820, filed on Apr. 28, 1997, now Pat. No. 6,059,064.

(30) Foreign Application Priority Data

May 2, 1996 (JP) .............................................. 8-135775

(51) Int. Cl.⁷ ................................................. B60K 6/02
(52) U.S. Cl. ..................................... 180/65.2; 180/243
(58) Field of Search ............................. 180/65.2, 65.3, 180/65.4, 65.6, 165, 178, 242, 243; 701/70, 94; 477/2, 3

(56) References Cited

U.S. PATENT DOCUMENTS

| | | | |
|---|---|---|---|
| 2,666,492 A | | 1/1954 | Nims et al. |
| 4,335,429 A | * | 6/1982 | Kawakatsu ................ 180/65.2 |
| 4,438,342 A | * | 3/1984 | Kenyon ..................... 180/65.2 |
| 5,125,485 A | * | 6/1992 | Lang ......................... 180/178 |
| 5,368,120 A | * | 11/1994 | Sakai et al. ................. 180/243 |
| 5,441,122 A | * | 8/1995 | Yoshida ..................... 180/65.2 |
| 5,654,887 A | * | 8/1997 | Asa et al. ................... 180/65.3 |
| 5,697,466 A | * | 12/1997 | Moroto et al. ............. 180/65.2 |
| 5,726,886 A | * | 3/1998 | Yamakado et al. ........... 701/70 |
| 5,775,449 A | * | 7/1998 | Moroto et al. ............. 180/65.2 |
| 5,789,881 A | | 8/1998 | Egami et al. |
| 5,842,534 A | * | 12/1998 | Frank ........................ 180/65.2 |
| 5,873,426 A | | 2/1999 | Tabata et al. |
| 5,979,257 A | | 11/1999 | Lawrie ........................ 74/335 |
| 6,262,491 B1 | * | 7/2001 | Kitajima et al. ........... 180/65.2 |

FOREIGN PATENT DOCUMENTS

| | | | | |
|---|---|---|---|---|
| FR | 2661141 | * | 10/1991 | ................ 180/65.2 |
| JP | 59-204402 | | 11/1984 | |
| JP | 64-077401 | | 3/1989 | |
| JP | 4-243627 | * | 8/1992 | ................ 180/65.3 |
| JP | 6-014445 | | 2/1994 | |
| JP | 6-319206 | | 11/1994 | |
| JP | 9-154205 | | 6/1997 | |
| WO | 92/20544 | * | 11/1992 | ................ 180/65.2 |

OTHER PUBLICATIONS

U.S. patent application Ser. No. 09/522,365, filed Mar. 9, 2000, pending.
U.S. patent application Ser. No. 09/619,656, filed Jul. 19, 2000, pending.

* cited by examiner

Primary Examiner—Frank Vanaman
(74) Attorney, Agent, or Firm—Oblon, Spivak, McClelland, Maier & Neustadt, P.C.

(57) ABSTRACT

A hybrid vehicle including: an engine and a motor-generator for outputting drive forces to run a vehicle; and a brake pedal for applying a braking force to the running vehicle. While an engine braking force is being established, it is detected that the brake pedal is depressed. After this depression of the brake pedal, the vehicle speed is detected so that the regenerative braking is effected by the motor generator on the basis of the detected vehicle speed.

16 Claims, 12 Drawing Sheets

FIG.11

| SHIFT POSITION / RUNNING DIRECTION | 1st | 2nd | 3rd | 4th | 5th | Rev | N |
|---|---|---|---|---|---|---|---|
| FORWARD | × | × | × | × | × | ○ | ● |
| REVERSE | ○ | ○ | ● | ● | ● | × | ● |

○ : HILL HOLD

● : HILL HOLD & ALARM II (TRANSMISSION DISABLE)

× : INACTIVE

HYBRID VEHICLE

This is a Continuation of application Ser. No. 08/845,820, filed Apr. 28, 1997 now U.S. Pat. No. 6,059,064.

BACKGROUND OF THE INVENTION

1. Field of the Invention

The present invention relates to a hybrid vehicle which is equipped with two kinds or more of prime movers for running a vehicle.

2. Related Art

In the prior art, there is a hybrid vehicle which is intended by combining two kinds or more kinds of prime movers to improve an overall efficiency while exploiting the merits of the individual prime movers and compensating the demerits. One example of this hybrid vehicle is disclosed in JP-A-7-186748.

The disclosed hybrid vehicle employs an engine and an electric motor as the prime movers of the two kinds and is constructed such that the drive force of the engine is transmitted to either the front wheels or the rear wheels whereas the drive force of the motor is transmitted to the wheels to which is not transmitted the drive force of the engine.

On the other hand, this hybrid vehicle is equipped with a controller for controlling its running state. To this controller, there are inputted a variety of signals which indicate the running states including the RPM and throttle opening of the engine, the steering angle, the depression of the brake pedal, the depression of the accelerator pedal and the gear position. The controller controls the motor to assist the drive force by the motor at an acceleration or deceleration when the vehicle runs straight or at a small steering angle.

However, what is performed by the hybrid vehicle, as disclosed in the aforementioned Laid-Open publication, is to compensate the shortage of the drive force of the engine with the rotational drive of tile motor on the basis of the various signals, as inputted to the controller, at an acceleration or deceleration when the vehicle runs straight or at a small steering angle. In other words, the drive force of the motor is simply used to assist the drive force of the engine, but the control cannot satisfy the specific running state, as intended by the driver. Thus, it cannot be said that the hybrid vehicle sufficiently exploits the motor for improving the running performance and the drivability.

SUMMARY OF THE INVENTION

A primary object of the present invention is to provide a hybrid vehicle which can exploit the drive force of one prime mover effectively, while the other prime mover is active, on the basis of the specific running state, as intended by the driver.

Another object of the present invention is to decide a demand of the driver on the basis of a behavior of the vehicle so that the other prime mover may be controlled to satisfy the demand.

In order to achieve these objects, therefore, the hybrid vehicle of the present invention is provided with: means for detecting the active state of an action unit to be activated by the driver; means for detecting the behavior of the vehicle; means for deciding whether or not the vehicle behavior is identical to the demand of the driver; and means for controlling another prime mover to satisfy the demand of the driver.

The action unit includes a brake unit and a throttle unit for controlling the output of an engine, and another prime mover includes a motor-generator, for example. Thus, if the vehicle speed does not drop although a braking is active, a braking force is established by the motor-generator so that the demand for the braking can be satisfied unless the driver does any further braking operation. On the contrary, if the vehicle speed or acceleration is not raised although the engine output is increased by controlling the throttle, the motor-generator can be activated to increase the drive force as the entirety of the vehicle thereby to satisfy the driver. Moreover, if it is intended to block the movement of the vehicle in the directed, as not intended by the driver, at a start of the vehicle on a slope, the vehicle is kept in the stopped state by the output torque of the motor-generator. As a result, the vehicle can be easily started on the slope.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 11 is a table enumerating the shift positions and the control content in the control examples of the hybrid vehicle of the present invention;

DETAILED DESCRIPTION OF THE PREFERRED EMBODIMENTS

Figure 1:
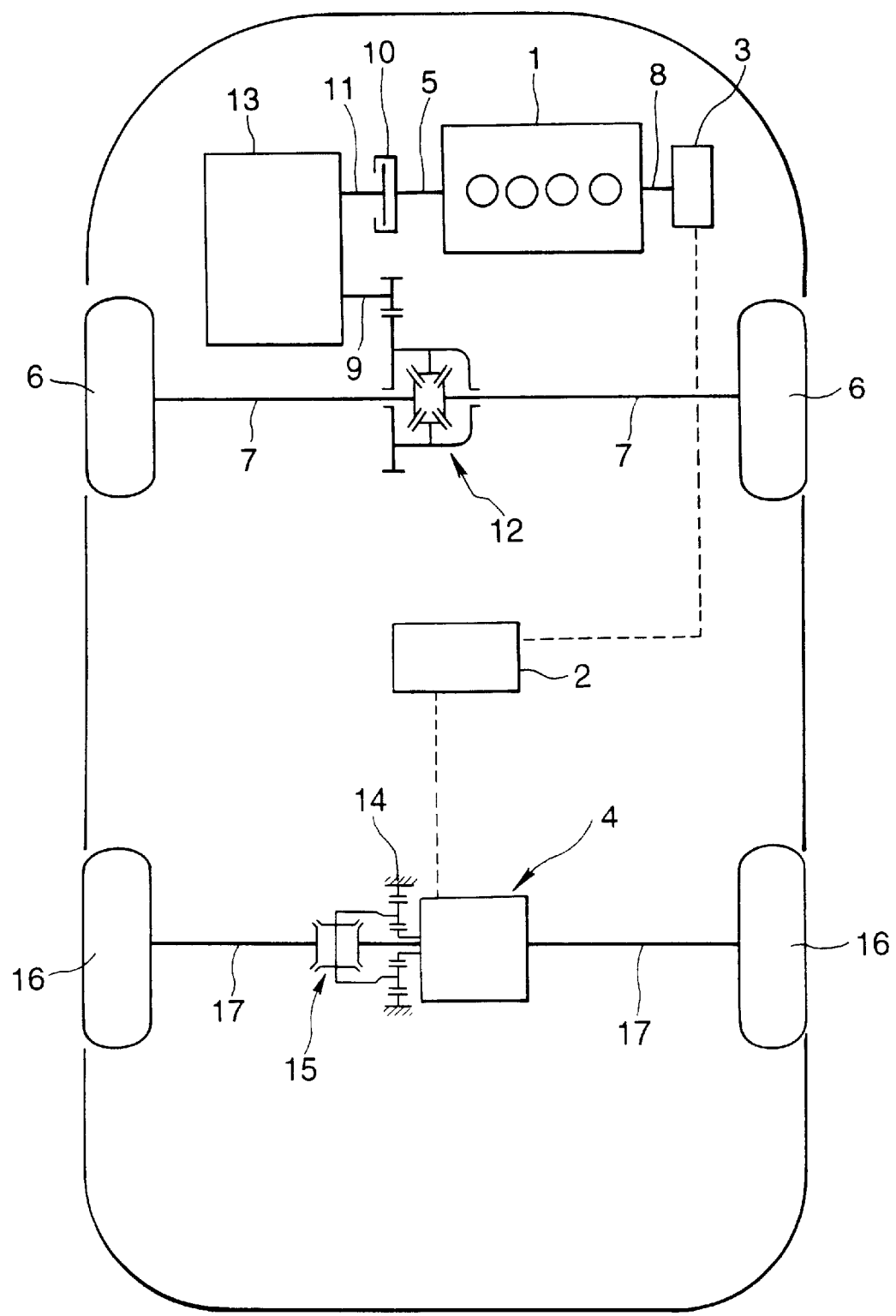
FIG. 1 is a conceptional diagram showing a schematic construction of a hybrid vehicle according to the present invention.

The present invention will be described in detail with reference to the accompanying drawings. On the front portion of a hybrid vehicle, as shown in FIG. 1, there is mounted a prime mover such as an engine 1. This engine 1 is exemplified by an internal combustion engine, as enabled to change its output by a throttle control, such as a gasoline engine, a diesel engine or an LPG engine.

In the front portion of the hybrid vehicle, moreover, there is arranged a motor-generator 3 which is connected with a battery 2 and given a regenerative function to convert a kinetic energy into an electric energy and a power running function to convert an electric energy into a kinetic energy. In the rear portion of the hybrid vehicle, on the other hand, there is arranged a power source of a category different from that of the engine 1, such as a motor-generator 4 which is given a regenerative function and a power running function. Moreover, the former motor-generator 3 may be used as a main power source for all electric accessories including the ignition system of the engine 3 and a power source for the motor-generator 4.

The output shaft 5 of the engine 1 is arranged generally in parallel with left and right drive shafts 7, which are connected to front wheels 6. At the side opposed to the motor-generator 3 across the engine 1, there is disposed a clutch mechanism 10 which is connected to the output shaft 5 and made of a wet or dry type friction clutch or an electromagnetic clutch. At the other side of the clutch mechanism 10, there is disposed a transmission 13 which is equipped with an input shaft 11 and a counter shaft 9. This transmission 13 is of a manual type of the known structure, which is equipped with a plurality of (not-shown) gear trains individually meshing with the input shaft 11 and the counter shaft 9, so that it can set five forward and one reverse gear stages, for example.

To the output shaft of the motor-generator 4 arranged in the rear portion of this hybrid vehicle, on the other hand, there are connected a reduction gear unit 14, as exemplified by a planetary s&ear mechanism, and a differential 15, so that the drive force of the motor-generator 4 is decelerated by the reduction gear unit 14 and then transmitted through left and right drive shafts 17 to rear wheels 16.

Figure 2:
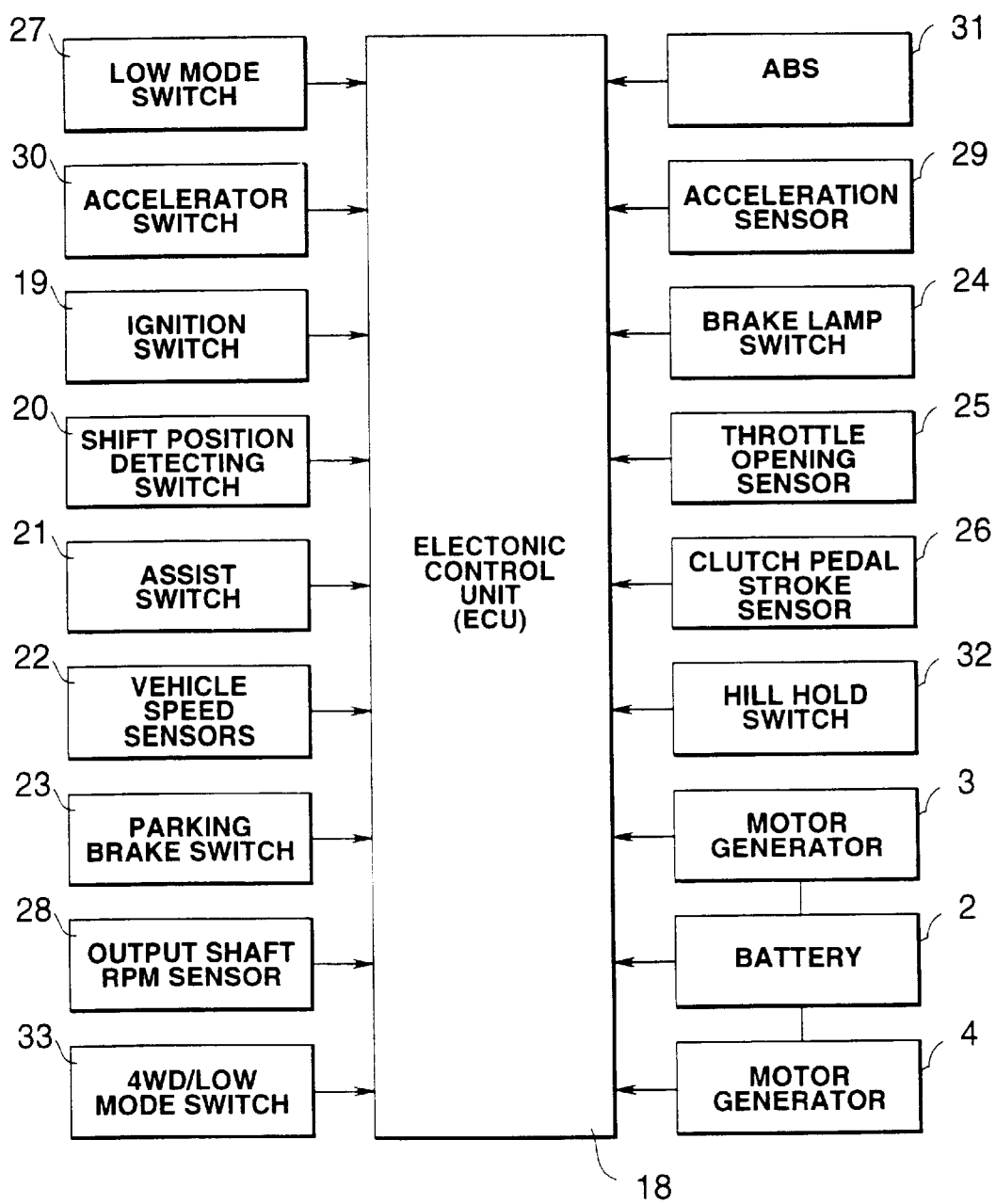
FIG. 2 is a block diagram showing a control circuit of the hybrid vehicle of the present invention.

FIG. 2 is a block diagram showing an essential control circuit of the hybrid vehicle. An electronic control unit (ECU) 18 is constructed of a microcomputer which is equipped with a central processing unit (CPU), memories (ROM and RAM) and an input/output interface. To this electronic control unit 18, there are inputted the voltage signal of the battery 2, the ON/OFF signal of an ignition switch 19, the signal of a shift position detecting switch 20 for detecting the shift position of the transmission 13, as selected by the driver, and the ON/OFF signal of an assist switch 21 for activating/deactivating the regenerative braking by the regenerative function of the motor-generator 4.

Further inputted to the electronic control unit 18 are the signals of vehicle speed sensors 22 attached to the front wheels 6 and the rear wheels 16, the signal of a parking brake switch 23 for detecting the application/release of the (not-shown) parking brake, the ON/OFF signal of a brake lamp switch 24 for detecting the active estate of a braking mechanism such as a brake pedal, a master cylinder, a brake disc or a wheel cylinder (none of which is shown), the signal of a throttle opening sensor 25 for detecting the throttle opening θ of the engine 1, the signal of a clutch pedal stroke sensor 26 for detecting the depressed state of the (not-shown) clutch pedal, and the ON/OFF signal of a LOW mode switch 27 for arbitrarily activating/deactivating the power running function of the motor-generator 4 in a low vehicle speed range. Here, the LOW mode means a mode in which the drive force can be arbitrarily increased.

Further inputted to the electronic control unit 18 are the signal of an RPM sensor 28 for detecting the RPM of the output shaft 5 of the engine 1, the signal of an acceleration sensor 29 for detecting the longitudinal acceleration of the running vehicle, the ON/OFF signal of an accelerator switch 30 for detecting the depression of the (not-shown) accelerator pedal, the action signal of an ABS (Anti-lock Brake System) 31, the ON/OFF signal of a hill hold switch 32 for activating the motor generator 4 in a predetermined running state to transmit the drive force to the front wheels 6 and the rear wheels 16, and the signal of a 4WD/LOW mode switch 32 for indicating a 4WD/LOW mode, in which the function of the LOW mode is added to the four-wheel drive.

The electronic control unit 18 detects the running state and stop state of the vehicle, the state of the braking mechanism, the active states of the engine 1 and the motor generator 4, and the shift position of the transmission 13. On the basis of these detection results, the signals of the assist switch 21, the LOW mode switch 27 and the hill hold switch 32, the electronic control unit 18 controls the activation/deactivation (or free) of the motor-generators 3 and 4 and the currents/voltages for activating the motor-generators 3 and 4.

For these actions, the electronic control unit 18 is stored in advance with data for controlling the motor-generators 3 and 4 on the basis of the detection results, such as: a reference throttle opening; a reference vehicle speed (or a lower limit vehicle speed) and an ending vehicle speed (or an upper limit vehicle speed) for providing lower and upper limits to generate the regenerative braking force, and a predetermined reference velocity; an upper limit vehicle speed and a lower limit vehicle speed for activating the power running function, and a reference acceleration or a predetermined reference velocity, and a drive force according to the throttle opening.

The hybrid vehicle thus constructed can select a first mode, in which it is run exclusively by the drive force of the engine 1, a second mode, in which it is run both by the drive force of the engine 1 and by the drive force of the motor-generator 4, and a third mode in which it is run exclusively by the drive force of the motor-generator 4.

In the first mode, the drive force of the engine 1 is transmitted to the front wheels 6 through the output shaft 5, the clutch mechanism 10, the transmission 13, a differential unit 12 and the drive shafts 7. In this case, the motor-generator 4 is kept in the inactive (or free) state. In the first running mode, if the drive force of the engine 1 is over the running load, the motor-generator 4 can be driven by the excess of the drive force to function as a generator so that the generated electric energy can be stored in the battery 2.

In the second running mode, on the other hand, the drive force of the engine 1 is transmitted as in the first mode to the front wheels 6, and the drive force of the motor generator 4, as electrically energized by the battery 2, is transmitted to the rear wheels 16. This second mode is divided into a 4WD mode, in which the motor generator 4 is driven at all times, an auxiliary mode, in which the motor generator is driven exclusively in a predetermined running state, and a 4WD/LOW mode in which a high drive force is generated at all times by the 4WD/LOW mode switch 33.

In the third running mode, moreover, at least one of the motor generators 3 and 4 is driven as in the second mode, and the engine 1 is kept in the stop state or the drive force of the engine 1 is transmitted not to the front wheels 6 but to the motor generator 3 so that the motor generator 3 may function as a generator.

While the vehicle is running, the detection signals of the vehicle speed sensors 22, as attached to the front wheels 6 and the rear wheels 16, is inputted to the electronic control unit 18 so that the control signals on the basis of the detection signals are outputted from the electronic control unit 18. For sufficient cornering forces and braking forces of the front wheels 6 and the rear wheels 16, more specifically, the slip ratios of these wheels 6 and 16 are set by controlling the brake oil pressure with the ABS 31.

Next, a control example for running the aforementioned hybrid vehicle will be described with reference to the flow chart of FIG. 3. First of all, the ignition switch 19 is turned ON to start the engine 1, and the drive force of the engine 1 is transmitted to the front wheels 6 to start the run of the vehicle (at Step S1) by selecting the shift position and by depressing the accelerator pedal and the clutch pedal.

When the vehicle runs, it is decided (at Step S2) by the electronic control unit 18 whether or not the assist switch 21 is turned ON. This assist switch 21 corresponds to select means in the present invention for executing the later-described assist control using the motor-generator 4 when turned ON. If the answer of Step S2 is "YES", a detected vehicle speed V, as detected by the vehicle speed sensor 22 corresponding to behavior detecting means or vehicle speed detecting means in the present invention, and a reference vehicle speed VS for the lower limit of the regenerative braking are compared by the electronic control unit 18 to decide whether or not the detected vehicle speed V is over the reference vehicle speed VS (at Step S3). If the answer of Step S3 is "YES", it is decided (at Step S4) by the electronic control unit 18 whether the accelerator pedal is not depressed. If the answer of Step S4 is "YES", that is, if the engine braking force is established, it is decided (at Step S5) by the electronic control unit 18 whether or not the brake pedal is depressed. These accelerator pedal and brake pedal correspond to activation units of the present invention, and hence the electronic control unit 18 or Steps S4 and S5 correspond to activation detect means of the present invention.

If the answer of Step S5 is "YES", it is decided (at Step S6) whether or not the brake pedal is returned. If the answer of Step S6 is "YES", a vehicle speed V1 at that time is stored in the electronic control unit 18 (at Step S7), and it is decided (at Step S8) whether or not the vehicle speed V1 is over the reference vehicle speed VS.

If the answer of Step S8 is "YES", after t seconds from the decision of Step S8, it is decided (at Step S9) by the electronic control unit 18 whether or not the vehicle speed V is over the sum (V1+a) of the vehicle speed V1 and a predetermined speed "a". In short, the following situation can be detected according to the foregoing Steps S4 to S9. When the vehicle runs downhill a long slope while using the engine braking force, for example, the vehicle speed rises because the engine braking force fails to provide a sufficient braking force, as required. Thus, even once the brake pedal is depressed to decrease the vehicle speed, the vehicle speed may arise again so high as to require another depression of the brake pedal. Therefore, the electronic control unit 18 and Step S9 correspond to decide means in the present invention.

If the answer of Step S9 is "YES", the motor generator 4 is activated by the electronic control unit 18 to generate the regenerative braking force to assist the engine braking force (at Step S10). Here, the regenerative braking force to be generated is desirably set to such a level as can once reduce the vehicle speed V to (V1+b) and then keep it at the level (V1+b). Incidentally, this value "b" is smaller than the foregoing value "a". Thus, the electronic control unit 18 and the motor-generator 4 or Step S10 correspond to assist control means of the present invention.

If any of the answers of Steps S2, S3, S4, S5, S7 and S8 is "NO", on the contrary, it is decided by the electronic control unit 18 that the road is in the situation requiring no generation of or increasing in the braking force, and the regenerative braking of the motor-generators 3 and 4 is inactivated (at Step S11). If the gradient of the downhill is small, for example, the answer of Step 9 is "NO". In this case, it is decided (at Step S12) by the electronic control unit 18 whether or not the vehicle speed V1 is below the reference vehicle speed V1. If the answer of Step 12 is "YES", the motor-generator 4 is kept inactivated (or free) (at Step S13). If the answer of Step S12 is "NO", it is meant that the vehicle is running downhill generally at a constant speed, and the flow is returned to Step S7 to repeat the execution of the aforementioned routine.

Figure 3:
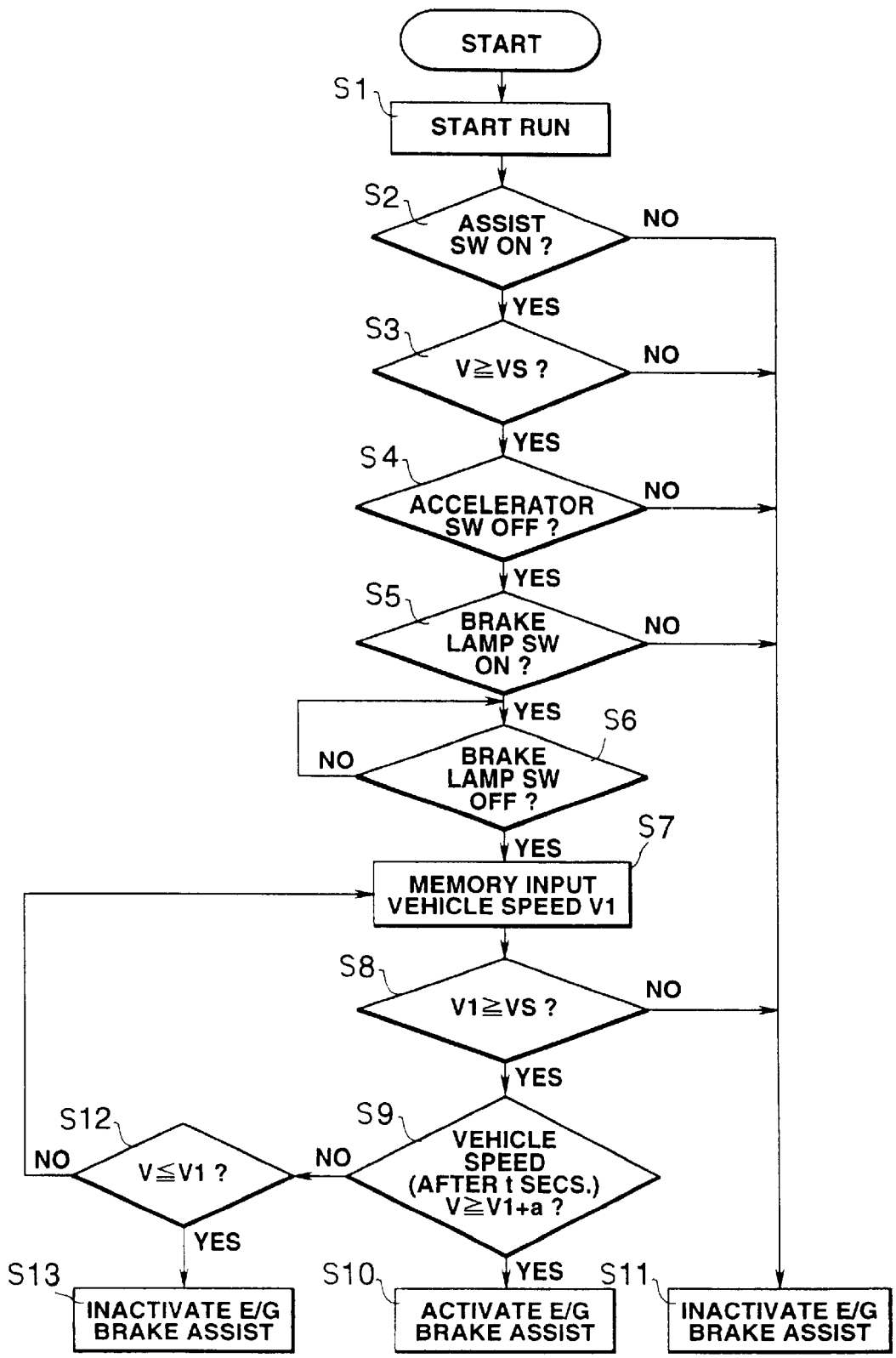
FIG. 3 is a flow chart showing an example of the control of the hybrid vehicle of the present invention.

Thus, according to the control example of FIG. 3, on the basis of the vehicle running state after the brake pedal has been depressed and returned while the engine braking force is being generated, the engine braking force is assisted to keep the vehicle speed constant by the regenerative braking force of the motor-generator 4. As a result, even when the vehicle runs downhill on a long slope, for example, the vehicle speed is kept constant without any frequent depression of the brake pedal by the driver, so that the running performance and drivability are improved.

Figure 4:
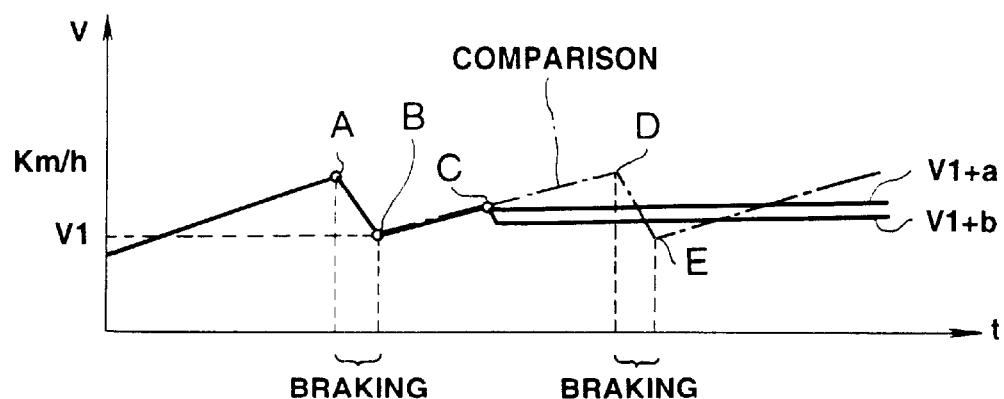
FIG. 4 is a graph illustrating relations between the vehicle speed and the time in the control example of FIG. 3.

FIG. 4 is a graph plotting relations between the vehicle speed V of hybrid vehicles and the time "t" and presents a comparison without the regenerative braking by the motor-generator by a single-dotted line and the control example of FIG. 3, i.e., an embodiment of the present invention by a solid line. In the comparison, the brake pedal is released at point B, depressed again at point D, where the vehicle speed arises over V1, and released at point E where the vehicle speed falls below V1. Thus, the comparison experiences the repetition of rises in the vehicle speed. Therefore, the comparison is troubled by depressing the brake pedal frequently each time the vehicle speed arises.

According to the embodiment, on the contrary, the brake pedal is depressed at point A, where the vehicle speed arises, so that the vehicle speed falls. The brake pedal is released at point B, where the vehicle speed takes the value V1. After this, the braking by the motor generator 4 is started at point C where the vehicle speed arises again over (V1+a). From now on, the vehicle speed is kept constant so that the brake pedal need not be frequently depressed.

Figure 5:
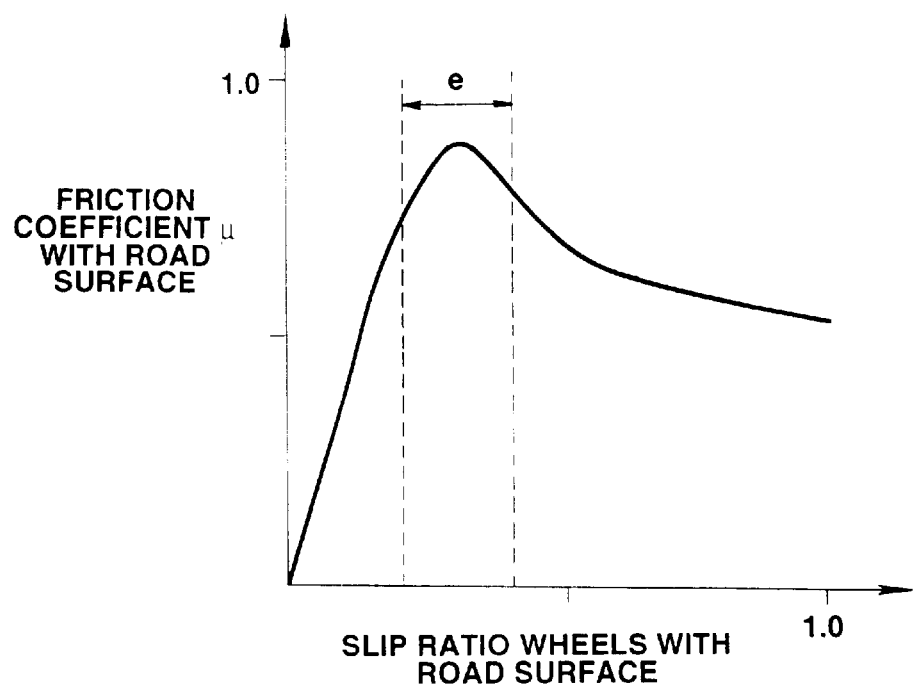
FIG. 5 is a diagram illustrating a characteristic curve plotting a relation between the coefficient of friction of wheels with a road surface and the slip ratio of wheels.

In order to establish a braking force sufficient for the regenerative braking, according to the present embodiment, the action of the motor generator 4 may desirably be controlled to give the front wheels 6 or the rear wheels 16 a low slip ratio for a coefficient $\mu$ of friction with the road surface. This will be specifically explained with reference to FIG. 5 presenting a characteristic curve plotting a relation between the friction coefficient $\mu$ with the road surface and the slip ratio of the wheels. The motor-generator 4 may desirably be controlled to a range "e", in which the slip ratio of the wheels is low (generally at about 0.3 for the dry road surface) for a high friction coefficient $\mu$ with the road surface (generally at about 0.9). This control of the motor-generator 4 is executed by adjusting the current/voltage with the electronic control unit 18.

Figure 6:
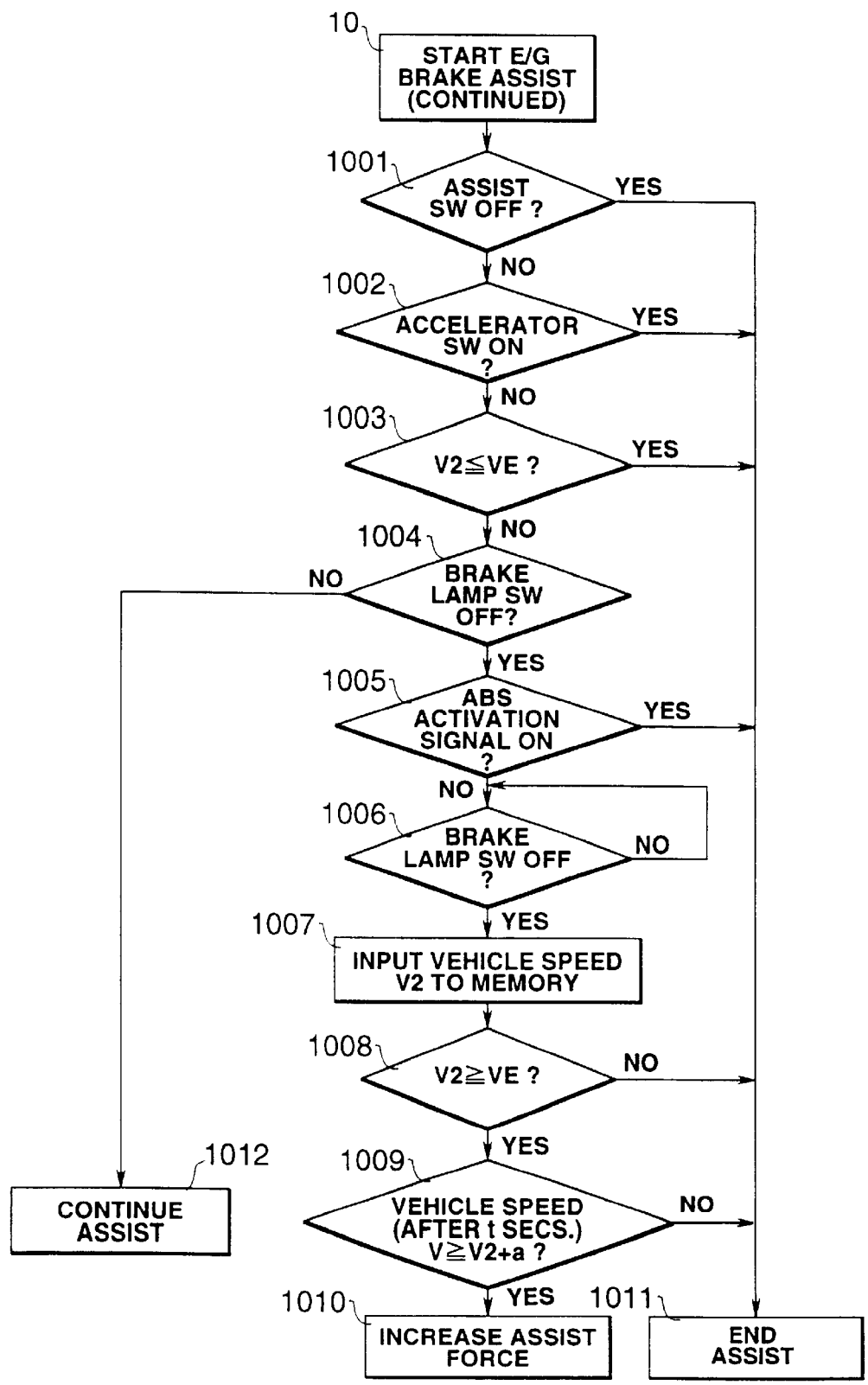
FIG. 6 is a flow chart showing a control example of the hybrid vehicle of the present invention.

FIG. 6 is a flow chart showing a control example of the routine at and after Step 10 of FIG. 3. After Step 10, it is decided (at Step 1001) by the electronic control unit 18 whether or not the assist switch 21 is turned OFF. If the answer of Step 1001 is "YES", it is decided (at Step 1002) by the electronic control unit 18 whether or not the accelerator pedal is depressed. This Step 1002 decides whether or not the vehicle comes to the road situation in which a downhill ends to a flat road or an uphill, for example.

If the answer of Step 1002 is "NO", that is, if it is detected that the downhill continues, it is decided (at Step 1003) by the electronic control unit 18 whether or not a vehicle speed V2 is below an ending vehicle speed VE for the lower limit of the regenerative braking.

If the answer of Step 1003 is "NO", it is decided (at Step 1004) by the electronic control unit 18 whether or not the brake pedal is depressed. If the answer of Step 1004 is "YES", it is decided (at Step 1005) by the electronic control unit 18 whether or not the ABS 31 is active. In other words, Step 1004 can detect the road situation, in which the vehicle speed increases even in the regenerative braking, that is, in which the gradient of the slope grows higher and higher so that the vehicle speed may probably rise again to require the depression of the brake pedal from the prevailing regenerative braking force.

If the answer of Step 1005 is "NO", it is decided (at Step 1006) by the electronic control unit 18 whether or not the brake pedal is released. If the answer of Step 1006 is "YES", the vehicle speed V2 is stored by the electronic control unit 18 (at Step 1007). Then, it is decided (at Step 1008) by the electronic control unit 18 whether or not the vehicle speed V2 is over the ending vehicle speed VE. If the answer of Step 1008 is "YES", it is decided (at Step 1009) whether or not the vehicle speed V after t seconds is over the sum of the vehicle speed V2 and the predetermined speed "a".

If the answer of Step 1009 is "YES", the control is made to increase the regenerative braking forces of the motor-generators 3 and 4 (at Step 1010). These regenerative braking forces are set to values necessary for keeping the stored vehicle speed V2.

Thus, according to the control example of FIG. 6, if the road situation is such that the brake pedal is depressed again during the regenerative braking of the motor generator 4, namely, such that the gradient of the downhill jumps midway, the regenerative braking forces of the motor-generators 3 and 4 are increased according to the magnitude of the gradient so that the running performance and the drivability are further improved.

Incidentally, if any of the answers of Steps 1001, 1002 and 1003 is "YES", if the answer of Step 1008 is "NO", or if the answer of Step 1009 is "NO", the road situation needs no regenerative braking force, that is, the vehicle comes to a flat road or an uphill, or the downhill continues by with a smaller gradient. Therefore, the regenerative braking of the motor-generator 4 is ended (at Step 1011).

If the answer of Step 1004 is "NO", on the contrary, the downhill has such a gradient as to need the prevailing regenerative braking force so that the regenerative braking force of the motor-generator 4 is continued (at Step 1012). If the answer of Step 1005 is "YES", the routine advances to Step 1010 to avoid influencing the vehicle speed detecting function necessary for the action of the ABS 31 and the braking force. In the control example of FIG. 6, too, the motor-generator 4 is controlled to keep the range "e" of FIG. 5.

Figure 7:
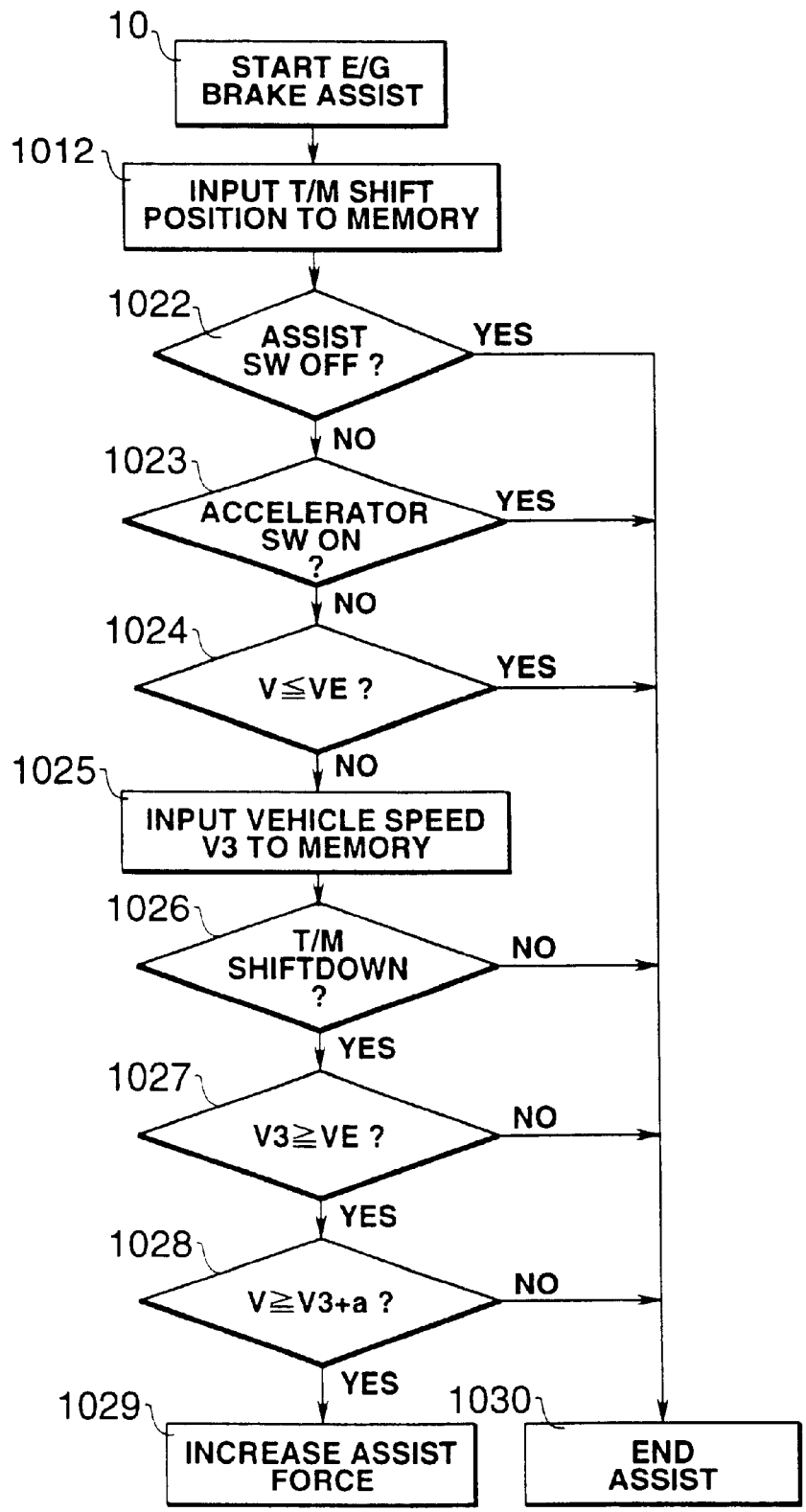
FIG. 7 is a flow chart showing a control example of the hybrid vehicle of the present invention.

FIG. 7 is a flow chart showing another control example of the routine at and after Step 10 of FIG. 3. When the regenerative braking of the motor-generator 4 is started, the shift position of the transmission 13 is detected on the basis of the signal of the shift position switch 20 so that the detected shift position is stored in the electronic control unit 18 (at Step 1021). It is then decided (at Step 1022) by the electronic control unit 18 whether or not the assist switch 21 is turned OFF. If the answer of Step 1022 is "NO", it is decided (at Step 1023) by the electronic control unit 18 whether or not the accelerator pedal is depressed.

If the answer of Step 1023 is "NO", it is decided (at Step 1024) by the electronic control unit 18 whether or not the vehicle speed V is below the ending vehicle speed VE for the lower limit of the regenerative braking. If the answer of Step 1024 is "NO", a vehicle speed V3 at that time is stored in the electronic control unit 18 (at Step 1025), and it is decided (at Step 1026) whether or not the transmission 13 is shifted down, that is, whether or not the gradient of a downhill being followed is at such a level as to require a higher engine braking force than the prevailing one. In short, this Step 1026 corresponds to downshift decide means of the present invention.

If the answer of Step 1026 is "YES", it is decided (at Step 1027) whether or not the vehicle speed V3 after the downshift is over the ending vehicle speed VE. If the answer of Step 1027 is "YES", it is decided (at Step 1028) by the electronic control unit 18 whether or not the vehicle speed V is over the sum of the vehicle speed V3 and the predetermined speed "a". If the answer of Step 1028 is "YES", that is, if the vehicle is still running short of the engine braking force even after the downshift, the regenerative braking force of the motor-generator 4 is increased (at Step 1029). This regenerative braking force is desirably set to such a value that the stored vehicle speed V3 may be lower to and kept at the vehicle speed (V3−b).

Incidentally, if any of the answers of Steps 1022, 1023 and 1024 is "YES", or if any of the answers of Steps 1026, 1027 and 1028 is "NO", the vehicle comes to such a road in the situation where the regenerative braking force is unnecessary, as to a flat road or an uphill so that the regenerative braking by the motor generator 4 is released (at Step 1030).

Thus, according to the control example of FIG. 7, in addition to the effects similar to those of the control example of FIG. 3, the regenerative braking force of the motor-generator 4 is increased according to the degree of requirement for the engine braking force, so that the running performance and the drivability when the vehicle runs on a downhill having a gradient increased midway are further improved. In this control example, too, the motor-generator 4 is so controlled as in the control example of FIG. 3 that the state of the front wheels 6 or the rear wheels 16 may fall within the range "e" of FIG. 5.

Figure 8:
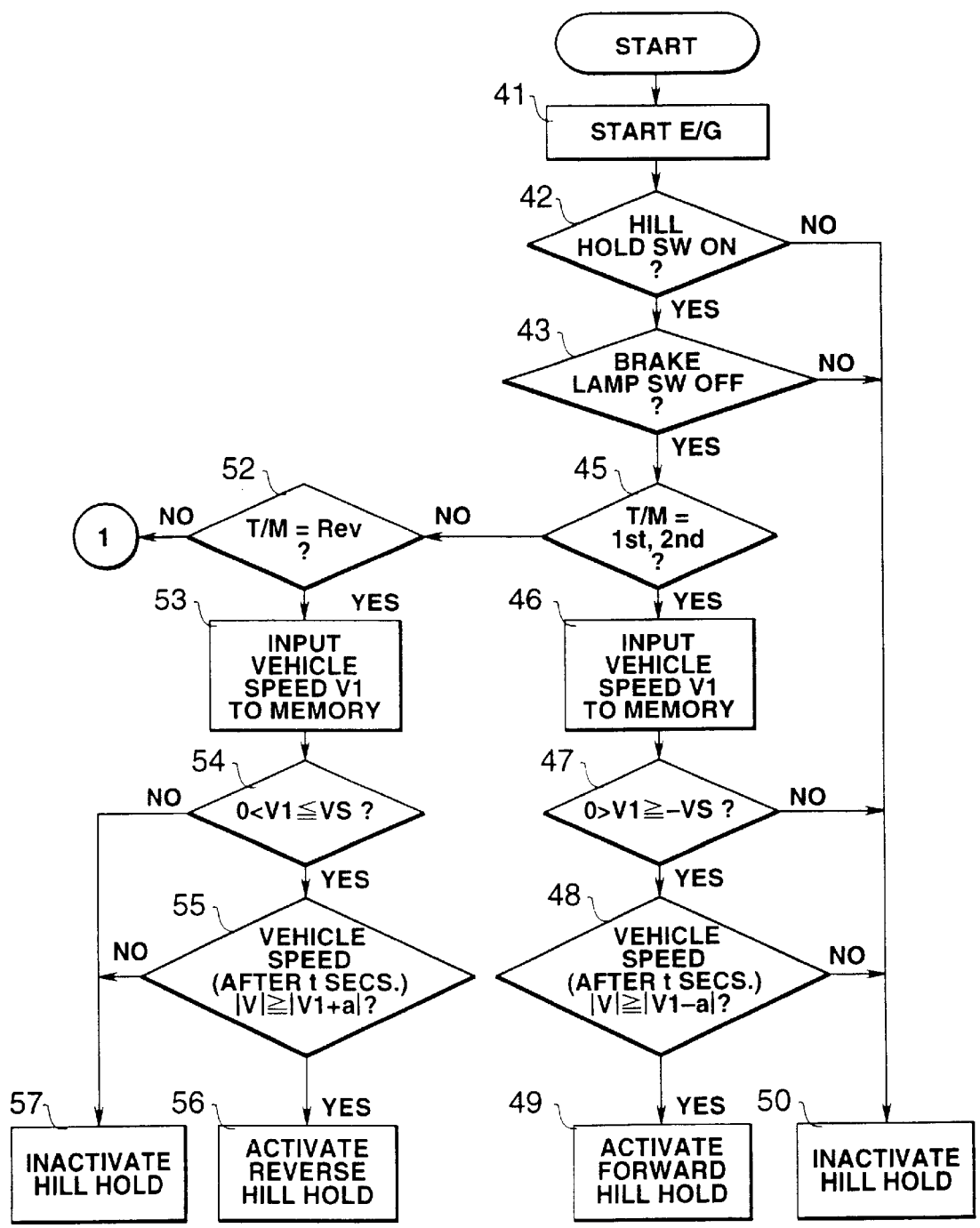
FIG. 8 is a flow chart showing a control example of the hybrid vehicle of the present invention.
Figure 9:
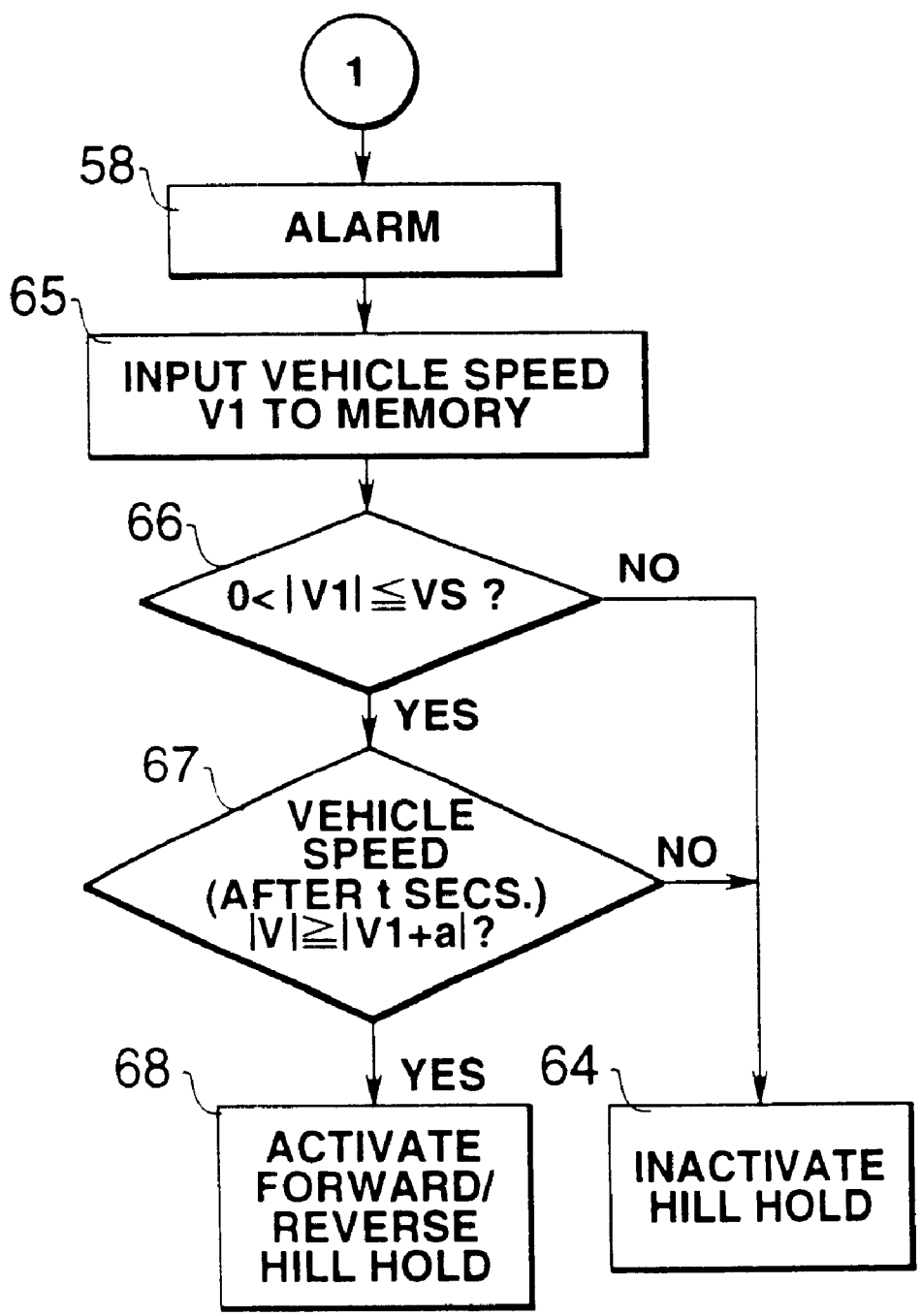
FIG. 9 is a flow chart showing a control example of the hybrid vehicle of the present invention.
Figure 10:
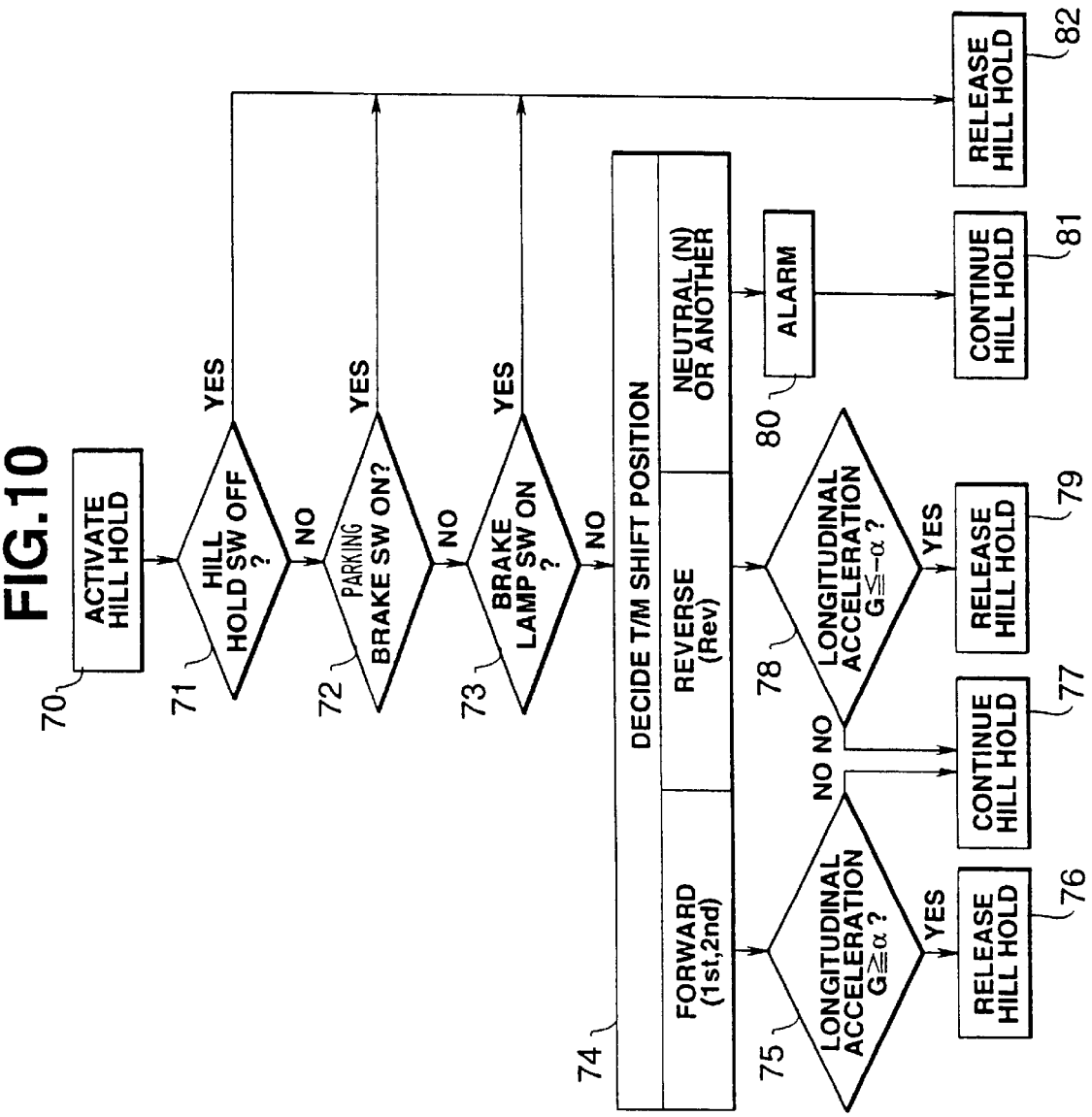
FIG. 10 is a flow chart showing a control example of the hybrid vehicle of the present invention.

FIGS. 8, 9 and 10 are flow charts showing still another embodiment of the present invention, as can be applied as it is to the hybrid vehicle of the construction of FIGS. 1 and 2. In the present embodiment, the transmission 13 is constructed as an automatic transmission which has forward ranges (of first to fifth speeds), a neutral range and a reverse range.

In the control example of FIG. 8, the electronic control unit 18 detects the start of the engine 1 (at Step 41), and decides (at Step 42) whether or not the hill hold switch 32 corresponding to the select means of the present invention is turned ON. If the answer of Step 42 is "YES", it is decided (at Step 43) by the electronic control unit 18 whether or not the brake pedal is released. If the answer of Step 43 is "YES", it is decided (at Step 45) by the electronic control unit 18 whether or not the first or second speed of the forward range is selected in the transmission 13, that is, whether or not the driver intends to start the vehicle forward. This Step 45 corresponds to action detecting means of the present invention.

If the answer of Step 45 is "YES", the vehicle speed V1 at that time is stored in the electronic control unit 18 (at Step 46). It is then decided (at Step 47) by the electronic control unit 18 whether or not the vehicle is running backward and then whether or not the vehicle speed V1 is over the lower limit vehicle speed (−VS) for the hill hold.

If the answer of Step 47 is "YES", it is decided (at Step 48) whether or not the vehicle speed V after t seconds from the start of the reverse run is over the difference of the vehicle speed V1 from the predetermined speed "a". In other words, at Steps 47 and 48, the running direction as intended by the driver is compared with the actual one, and if the (forward) running direction selected by the driver is different from the actual (reverse) one, it is decided whether or not the vehicle is running backward at a speed (in an absolute value) higher than the previously selected value. Therefore, Step 47 corresponds to the behavior detecting means of the present invention, and Step 48 corresponds to the decide means of the present invention.

If the answer of Step 48 is "YES", that is, if the vehicle is reversed (or downhill) by the slope resistance although the driver's intention is to run the vehicle uphill in the forward range, the motor generator 4 is driven in the direction to run the vehicle forward so that the vehicle is stopped or run forward by the hill hold function (at Step 49). In short, Step 49 corresponds to the assist control means of the present invention.

If the answer of Step 42 is "NO", the road situation is such a flat road, for example, that the driver needs no hill hold, and the hill hold function is inactivated (at Step 50). If the answer of Step 43 is "NO", moreover, the hill hold is unnecessary because the vehicle is being stopped by the brake system, and the routine advances to Step 50. If either of the answers of Steps 47 and 48 is "NO", moreover, the vehicle behavior is in the state, as intended by the driver, so that the routine advances to Step 50.

If the answer of Step 45 is "NO", on the contrary, it is decided (at Step 52) by the electronic control unit 18 whether or not the reverse range is selected. This Step 52 corresponds to the action detecting means of the present invention, and if its answer is "YES", the vehicle speed V1 at that time is stored (at Step 53) in the electronic control unit 18. It is then decided (at Step 54) by the electronic control unit 18 whether or not the vehicle is running forward and whether or not the forward vehicle speed V1 is below the upper limit vehicle speed VS for the hill hold. This Step 54 corresponds to the behavior detecting means of the present invention.

If the answer of Step 54 is "YES", it is decided (at Step 55) whether or not the vehicle speed V after t seconds from the start of the forward run is over the sum of the vehicle speed V1 and the predetermined speed "a". In short, at Steps 54 and 55, the (reverse) running direction, as selected by the driver, is compared with the actual (forward) running direction, and if it is decided that the vehicle is running forward against the intention of the driver, it is decided whether or not the vehicle is running forward at a speed higher than the preset value. Hence, Step 54 corresponds to the decide means of the present invention.

If the answer of Step 55 is "YES", that is, if the road situation is such that the vehicle is run forward (or downhill) by the slope resistance although the intention of the driver is to run the vehicle uphill on the slope at the reverse stage, the motor-generator 4 is activated in the direction to run the vehicle backward, and the hill hold function is activated (at Step 56) to stop the vehicle or run it backward. If either the answers of Steps 54 and 55 is "NO", on the contrary, the running state is that which is intended by the driver, and the hill hold function is inactivated (at Step 57). In short, Step 56 corresponds to the assist control means of the present invention.

On the other hand, if the answer of Step 52 of FIG. 8 is "NO", that is, if either any of the third to fifth speeds of the forward range or the neutral range is selected by the transmission 13, the routine advances to the control content of FIG. 9 so that an alarm noticing that the vehicle cannot be started in the prevailing shift position is made by a voice (at Step 58). Then, the vehicle speed V1 at that time is stored in the electronic control unit 18 (at Step 65). It is then decided by the electronic control unit 18 whether or not the vehicle is running backward. If this answer is "YES", it is decided (at Step 66) whether or not the reverse vehicle speed V1 is below the upper limit vehicle speed VS for the hill hold. This Step 66 corresponds to the behavior detecting means of the present invention.

If the answer of Step 66 is "YES", it is decided (at Step 67) whether or not the vehicle speed V after t seconds from the start of the forward or backward run is over the sum of the vehicle speed V1 and the predetermined speed "a". This Step 67 corresponds to the decide means of the present invention. If the answer of Step 67 is "YES", the road situation is such that the vehicle is reversed (downhill) by the slope resistance although the driver's intention is to run the vehicle forward on a slope. In this case, the motor generator 4 is activated to run the vehicle forward, and the hill hold function is activated (at Step 68) to stop the vehicle or to run it forward. This Step 68 corresponds to the assist control means of the present invention. If either of the answers of Steps 66 and 67 is "NO", on the contrary, the running state is that which is intended by the driver, and the routine advances to Step 64.

FIG. 10 is a flow chart showing a control example after the vehicle has been hill-held in the control example of FIG. 8 or 9. When the vehicle is stopped at Step 70, it is decided (at Step 71) by the electronic control unit 18 whether or not the hill hold switch 32 is turned OFF. If the answer of Step 71 is "NO", it is decided by the electronic control unit 18 (at Step 72) whether or not the parking brake is applied. If the answer of Step 72 is "NO", it is decided (at Step 73) by the electronic control unit 18 whether or not the brake pedal is depressed.

If the answer of Step 73 is "NO", the shift position of the transmission 13 is decided (at Step 74). If it is detected at Step 74 that the first or second speed of the forward range is selected, a longitudinal acceleration G of the vehicle, as detected from the signal of the acceleration sensor 29 or the acceleration detecting means, and a reference acceleration α, as stored in advance, are compared by the electronic control unit 18 to decide whether or not the longitudinal acceleration G is over the reference acceleration α (at Step 75). If the answer of Step 75 is "YES", the hill hold function by the motor-generator 4 is released (at Step 76). If the answer of Step 75 is "NO", the hill hold function is continued (at Step 77). In short, the behavior of the vehicle is decided by using the longitudinal acceleration as a parameter so that the assist control is released or continued.

If it is decided at Step 74 that the reverse range is detected in the transmission 13, the longitudinal acceleration G of the vehicle, as detected by the acceleration sensor 29, and the previously stored reference acceleration (−α) are compared by the electronic control unit 18 to decide whether or not the longitudinal acceleration G is below the reference acceleration (−α) (at Step 78). In short, Step 78 decides whether or not the driver intends to increase the reverse speed. If the answer of Step 78 is "YES", the hill hold function by the motor-generators 3 and 4 is released (at Step 79). Incidentally, the routine advances to Step 77 if the answer of Step 78 is "NO".

If it is detected at Step 74 that the neutral range or any of the third to fifth speeds in the forward range is selected in the transmission 13, it is alarmed (at Step 80) that the vehicle cannot be started in the prevailing shift position, and the hill hold function is continued (at Step 81). Incidentally, if any of the answers of Steps 71, 72 and 73 is "YES", the hill hold function is released (at Step 82).

Incidentally, in the control examples of FIGS. 8, 9 and 10, the hill hold function, as achieved by the motor-generator 4, is controlled to such a value as to stop or run the vehicle in the direction intended by the driver.

Thus, according to the control examples of FIGS. 8, 9 and 10, if the running/stopping state of the vehicle, as intended by the driver, is different from the actual vehicle state, the control is made by the drive force of the motor-generator 4 such that the vehicle may be stopped or run forward/backward to approach the state intended by the driver. When the vehicle uphills a slope or stops on a slope, for example, the vehicle is kept in the driver's intended state, without requiring the driver for the troublesome operations to adjust the depression of the clutch pedal, so that the running performance and the drivability are improved.

FIG. 11 is a table enumerating the corresponding relations between the shift positions of FIGS. 8, 9 and 10 and the activations/inactivations and alarms of the hill hold function. In FIG. 11: symbols "○" indicate that the hill hold function is active; symbols "●" indicate that the hill hold function is active and that the alarm is made; and symbols "X" indicate that the hill hold function is inactive.

Figure 12:
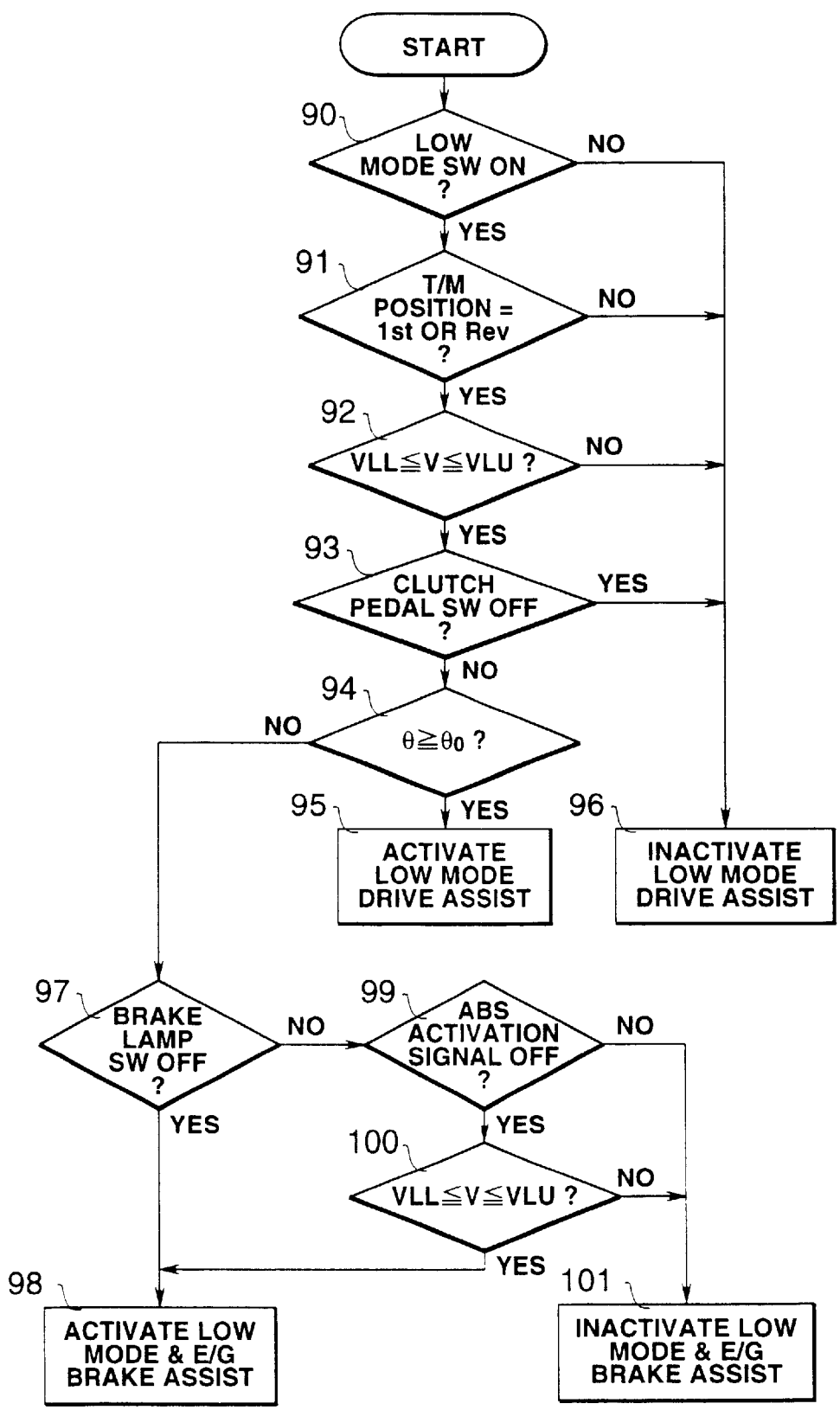
FIG. 12 is a flow chart showing a control example of the hybrid vehicle of the present invention.
Figure 13:
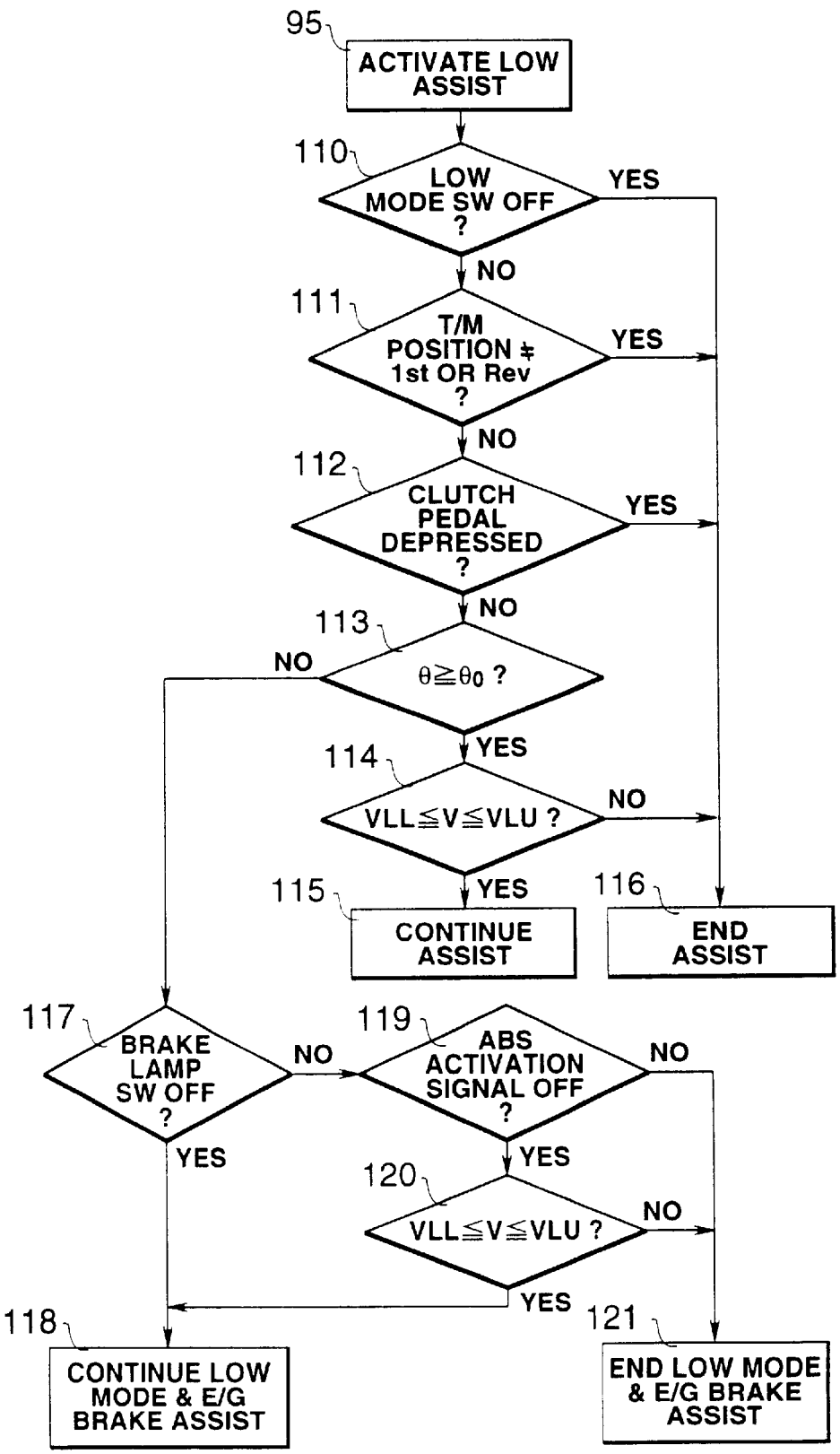
FIG. 13 is a flow chart showing a control example of the hybrid vehicle of the present invention.

FIGS. 12 and 13 are flow charts showing still another embodiment of the present invention. The control examples of FIGS. 12 and 13 are applied to the hybrid vehicle, as shown in FIGS. 1 and 2. In the control example of FIG. 12, in the started state of the engine 1, it is decided first of all (at Step 90) by the electronic control unit 18 whether or not the vehicle is in the four-wheel drive state, in which the 4WD/LOW mode switch 33 corresponding to the activation unit of the present invention is ON. If the answer of Step 90 is "YES", it is decided (at Step 91) by the electronic control unit 18 whether or not the first forward speed or the reverse is selected by the transmission 13. These Steps 90 and 91 correspond to the action detecting means of the present invention.

If the answer of Step 91 is "YES", it is decided (at Step 92) whether or not the prevailing vehicle speed V is over an assist lower limit vehicle speed VLL and below an assist upper limit vehicle speed VLU. If the answer of Step 92 is "YES", it is decided (at Step 93) whether or not the clutch pedal is released. If the answer of Step 93 is "YES", it is decided (at Step 94) whether or not the accelerator pedal is depressed till the throttle opening θ exceeds the reference opening $θ_o$. This Step 94 corresponds to the behavior deciding means of the present invention.

If the answer of Step 94 is "YES", for example, it is decided that the vehicle is to run on a slope having a high gradient, and the motor-generator 4 is activated (at Step 95) doubly of the ordinary force to assist the drive force of the engine 1 with its drive force. Namely, Step 95 corresponds to the assist controlling means of the present invention. The drive force of the motor-generator 4 to be used for the assist is set to a value according to the throttle opening θ of the engine 1.

If any of the answers of Steps 90, 91, 92 and 93 is "NO", the motor-generator 4 is inactivated to assist no drive force (at Step 96). If the answer of Step 94 is "NO", it is decided (at Step 97) whether or not the brake pedal is released. If the answer of Step 97 is "YES", that is, if the brake pedal is not depressed in the road situation in which the vehicle is downhill in the idling state of the engine 1, the motor-generator 4 is activated (at Step 98) for the regenerative braking to assist the engine braking force. For this regenerative braking force, the current value of the motor-generator 4 is to establish such a vehicle speed that the engine 1 can run in the idling state.

If the answer of Step 97 is "NO", on the contrary, it is decided (at Step 99) by the electronic control unit 18 whether or not the ABS 31 is inactivated. If the answer of Step 99 is "YES", it is decided (at Step 100) whether or not the prevailing vehicle speed V is over the lower vehicle speed VLL for assisting the braking force and below the upper limit vehicle speed VLU.

The routine advances to Step 98, if the answer of Step 100 is "YES", but the regenerative braking is inactivated (at Step 101) if the answer of Step 100 is "NO". Incidentally, if the answer of Step 99 is "NO", the routine advances to Step 101 to prevent any influence from being exerted upon the vehicle speed detecting function by the ABS 31.

FIG. 13 is a flow chart showing a control example at and after Step 95 of FIG. 12. When the drive force by the motor-generator 4 is assisted, it is decided (at Step 110) by the electronic control unit 18 whether or not the 4WD/LOW mode switch 33 is turned OFF. If the answer of Step 110 is "NO", it is decided (at Step 111) whether or not the shift position of the transmission 13 is changed to one other than the first speed or the reverse.

If the answer of Step 111 is "NO", it is decided (at Step 112) whether or not the clutch pedal is depressed. If the answer of Step 112 is "NO", it is decided (at Step 113) whether or not the throttle opening θ exceeds the reference value $θ_o$. If the answer of Step 113 is "YES", it is decided (at Step 114) whether or not the prevailing vehicle speed V is over the lower limit vehicle speed VLL for the assist and below the upper limit vehicle speed VLU. If the answer of Step 114 is "YES", the assist of the drive force by at least one of the motor-generators 3 and 4 is continued (at Step 115). The drive force of the motor-generator 4 to be used for the assist is set to a value according to the throttle opening θ of the engine 1. Incidentally, if any of the answers of Steps 110, 111 and 112 is "YES", or if the answer of Step 114 is "NO", the assist of the drive force is ended (at Step 116).

If the answer of Step 113 is "NO", on the contrary, it is decided (at Step 117) whether or not the brake pedal is released. If the answer of Step 117 is "YES", that is, if the brake pedal is not depressed in the road situation in which the vehicle is downhill in the idling state of the engine 1, the regenerative braking by the motor-generator 4 is activated (at Step 118) to assist the engine braking force.

If the answer of Step 117 is "NO", it is decided (at Step 119) whether or not the ABS 31 is inactivated. If the answer of Step 119 is "YES", it is decided (at Step 120) whether or not the prevailing vehicle speed V is over the lower limit vehicle speed VLL for assisting the braking force and below the upper limit vehicle speed VLU.

If the answer of Step 120 is "YES", the routine advances to Step 118. If the answer of Step 120 is "NO", the regenerative braking is inactivated (at Step 121). Incidentally, if the answer of Step 119 is "NO", the routine advances to Step 121 to prevent any influence from being exerted upon the vehicle speed detecting function by the ABS 31. In the control examples of FIGS. 12 and 13, too, the regenerative braking or the braking force by activating the motor-generator 4 is so controlled that the states of the front wheels 6 and the rear wheels 16 may fall within the range "e" of FIG. 5.

Thus, according to the control examples of FIGS. 12 and 13, if the 4WD/LOW mode is selected, the motor-generator 4 is activated to assist the drive force of the engine 1 effectively. As a result, even in a road situation requiring a high drive force as when the vehicle is uphill on a slope or running on a rough road, a sufficient drive force according to the road situation can be established without requiring the driver for any troublesome operation. Moreover, the running performance and the drivability also are improved if the present embodiment is applied to a vehicle such as a passenger car, which has such a small space in the engine room that the drive force in a low speed cannot be augmented by the mechanical construction.

Incidentally, the prime mover to be applied to the present invention may be exemplified by an engine, a motor system, a flywheel system, a gas turbine or a fuel cell system and may use a plurality of prime movers of the same kind or combine prime movers of different kinds. Moreover, the foregoing embodiments are based on front engine, front wheel drive type car in which the engine 1 and the power train to be driven by the engine 1 are arranged in the front portion of the vehicle whereas the other prime mover and the power train to be driven by this prime mover are arranged in the rear portion of the vehicle. However, effects similar to the aforementioned ones can be achieved even if the other prime mover is arranged in tandem with respect to the drive system power train of the engine.

Moreover, the foregoing embodiments uses the motor generator having the power running/regenerative functions as the other prime mover but can use a hydraulic motor. Still moreover, the transmission can be exemplified by an automatic transmission equipped with a torque converter and a planetary gear mechanism, or a continuously variable transmission equipped with a pulley and a belt.

Here will be synthetically described the advantages to be achieved from the present invention. According to the present invention, as has been described hereinbefore, if the braking mechanism is activated while the vehicle is running and while one prime mover is active, the other prime mover establishes the braking force on the basis of running state after the activation of braking mechanism to suppress the vehicle speed. As a result, the vehicle speed can be suppressed to improve the running performance and the drivability without requiring the driver for frequent operation of the braking mechanism, even when the vehicle is downhill on a long slope.

According to the present invention, moreover, if the vehicle comes, while either prime mover is active, into a state different from the running or stop state selected by the driver, the other prime mover is activated to bring the vehicle state close to the running or stop state intended by the driver. As a result, even if the vehicle may be made downhill by the slope resistance while it is uphill or stopped on a slope, the driver can drive the vehicle uphill or stop it, as intended, without doing any troublesome operation, so that the running performance and the drivability are improved.

According to the present invention, still moreover, when the vehicle runs by the drive force of either prime mover after the drive state of the vehicle was selected by the driver, the other prime mover is actuated on the basis of the activated state of the former one. As a result, If the driver selects the drive state in advance, the drive force of either prime mover is sufficiently assisted by the other prime mover even when the vehicle runs on an uphill or on a rough road, so that a sufficient drive force according to the road situation can be achieved without any troublesome operation of the driver thereby to improve the running performance and the drivability.

In addition, since the drive force of one prime mover is sufficiently assisted by the other prime mover, a high drive force and a high engine braking force can be achieved without any change in the gear ratios of the transmission connected to the prime mover so that the transmission of the ordinary construction can be employed as it is. Since the other prime mover is controlled on the basis of the drive state of the vehicle, moreover, the increase/decrease in the drive force is realized without any manual operation of the driver so that the space for mounting the shift lever can be eliminated to improve the operability. At the time of increasing/decreasing the drive force, still moreover, the vehicle need not be stopped so that its running performance is improved.

What is claimed is:

1. A hybrid vehicle which has a plurality of prime movers individually controlled for running a vehicle, and action units to be activated by a driver for running and stopping the vehicle, comprising:

action detecting means for detecting the acting content of the action units executed by the driver as the driver's demand;

behavior detecting means for detecting the behavior of the vehicle through at least one of vehicle speed, vehicle acceleration/deceleration and a throttle opening of one of the prime movers;

decide means for deciding whether or not the vehicle behavior detected by said behavior detecting means corresponds to the driver's demand through the action units; and assist control means for controlling one of said prime movers so as to increase or decrease its output, when said decide means decides that the vehicle behavior detected by said behavior detecting means does not correspond to the driver's demand through the action units, to achieve a behavior of the vehicle consistent with activating said action units.

2. A hybrid vehicle according to claim 1, wherein the behavior detecting means includes means for detecting the behavior of the vehicle through vehicle speed.

3. A hybrid vehicle according to claim 1, wherein the behavior detecting means includes means for detecting the behavior of the vehicle through vehicle acceleration/deceleration.

4. A hybrid vehicle according to claim 1, wherein the behavior detecting means includes means for detecting the behavior of the vehicle through vehicle speed and vehicle acceleration/deceleration.

5. A hybrid vehicle according to claim 1, wherein the behavior detecting means includes means for detecting the behavior of the vehicle through vehicle acceleration.

6. A hybrid vehicle accordingto claim 1, wherein the behavior detecting means includes means for detecting the behavior of the vehicle through vehicle deceleration.

7. A hybrid vehicle according to claim 1, wherein the behavior detecting means includes means for detecting the behavior of the vehicle through vehicle acceleration and vehicle speed.

8. A hybrid vehicle according to claim 1,
wherein the behavior detecting means includes means for detecting the behavior of the vehicle through vehicle deceleration and vehicle speed.

9. A hybrid vehicle which has a plurality of prime movers individually controlled for running a vehicle, and action units acting for running and stopping the vehicle, comprising:
- action detecting means for detecting the content of an action executed by said action units;
- behavior detecting means for detecting the behavior of the vehicle;
- decide means for deciding whether or not the vehicle behavior detected by said behavior detecting means corresponds to that achieved by the action units; and
- assist control means for controlling one of said prime movers so as to increase or decrease its output, when said decide means decides that the vehicle behavior detected by said behavior detecting means does not correspond to that achieved by the action units, to achieve a behavior of the vehicle consistent with activating said action units,
- wherein the behavior detecting means includes means for detecting the behavior of the vehicle through a throttle opening of one of the prime movers.

10. A hybrid vehicle which has a plurality of prime movers individually controlled for running a vehicle, and action units acting for running and stopping the vehicle, comprising:
- action detecting means for detecting the content of an action executed by said action units;
- behavior detecting means for detecting the behavior of the vehicle;
- decide means for deciding whether or not the vehicle behavior detected by said behavior detecting means corresponds to that achieved by the action units; and
- assist control means for controlling one of said prime movers so as to increase or decrease its output, when said decide means decides that the vehicle behavior detected by said behavior detecting means does not correspond to that achieved by the action units, to achieve a behavior of the vehicle consistent with activating said action units,
- wherein the behavior detecting means includes means for detecting the behavior of the vehicle through vehicle speed and a throttle opening of one of the prime movers.

11. A hybrid vehicle which has a plurality of prime movers individually controlled for running a vehicle, and action units acting for running and stopping the vehicle, comprising:
- action detecting means for detecting the content of an action executed by said action units;
- behavior detecting means for detecting the behavior of the vehicle;
- decide means for deciding whether or not the vehicle behavior detected by said behavior detecting means corresponds to that achieved by the action units; and
- assist control means for controlling one of said prime movers so as to increase or decrease its output, when said decide means decides that the vehicle behavior detected by said behavior detecting means does not correspond to that achieved by the action units, to achieve a behavior of the vehicle consistent with activating said action units,
- wherein the behavior detecting means includes means for detecting the behavior of the vehicle through vehicle acceleration/deceleration and a throttle opening of one of the prime movers.

12. A hybrid vehicle which has a plurality of prime movers individually controlled for running a vehicle, and action units acting for running and stopping the vehicle, comprising:
- action detecting means for detecting the content of an action executed by said action units;
- behavior detecting means for detecting the behavior of the vehicle;
- decide means for deciding whether or not the vehicle behavior detected by said behavior detecting means corresponds to that achieved by the action units; and
- assist control means for controlling one of said prime movers so as to increase or decrease its output, when said decide means decides that the vehicle behavior detected by said behavior detecting means does not correspond to that achieved by the action units, to achieve a behavior of the vehicle consistent with activating said action units,
- wherein the behavior detecting means includes means for detecting the behavior of the vehicle through vehicle speed, vehicle acceleration/deceleration and a throttle opening of one of the prime movers.

13. A hybrid vehicle which has a plurality of prime movers individually controlled for running a vehicle, and action units acting for running and stopping the vehicle, comprising:
- action detecting means for detecting the content of an action executed by said action units;
- behavior detecting means for detecting the behavior of the vehicle;
- decide means for deciding whether or not the vehicle behavior detected by said behavior detecting means corresponds to that achieved by the action units; and
- assist control means for controlling one of said prime movers so as to increase or decrease its output, when said decide means decides that the vehicle behavior detected by said behavior detecting means does not correspond to that achieved by the action units, to achieve a behavior of the vehicle consistent with activating said action units,
- wherein the behavior detecting means includes means for detecting the behavior of the vehicle through vehicle acceleration and a throttle opening of one of the prime movers.

14. A hybrid vehicle which has a plurality of prime movers individually controlled for running a vehicle, and action units acting for running and stopping the vehicle, comprising:
- action detecting means for detecting the content of an action executed by said action units;
- behavior detecting means for detecting the behavior of the vehicle;
- decide means for deciding whether or not the vehicle behavior detected by said behavior detecting means corresponds to that achieved by the action units; and
- assist control means for controlling one of said prime movers so as to increase or decrease its output, when said decide means decides that the vehicle behavior detected by said behavior detecting means does not correspond to that achieved by the action units, to achieve a behavior of the vehicle consistent with activating said action units, wherein the behavior detecting means includes means for detecting the behavior of the vehicle through vehicle deceleration and a throttle opening of one of the prime movers.

15. A hybrid vehicle which has a plurality of prime movers individually controlled for running a vehicle, and action units acting for running and stopping the vehicle, comprising:

action detecting means for detecting the content of an action executed by said action units;

behavior detecting means for detecting the behavior of the vehicle;

decide means for deciding whether or not the vehicle behavior detected by said behavior detecting means corresponds to that achieved by the action units; and assist control means for controlling one of said prime movers so as to increase or decrease its output, when said decide means decides that the vehicle behavior detected by said behavior detecting means does not correspond to that achieved by the action units, to achieve a behavior of the vehicle consistent with activating said action units, wherein the behavior detecting means includes means for detecting the behavior of the vehicle through vehicle acceleration, vehicle speed and a throttle opening of one of the prime movers.

16. A hybrid vehicle which has a plurality of prime movers individually controlled for running a vehicle, and action units acting for running and stopping the vehicle, comprising:

action detecting means for detecting the content of an action executed by said action units;

behavior detecting means for detecting the behavior of the vehicle;

decide means for deciding whether or not the vehicle behavior detected by said behavior detecting means corresponds to that achieved by the action units; and assist control means for controlling one of said prime movers so as to increase or decrease its output, when said decide means decides that the vehicle behavior detected by said behavior detecting means does not correspond to that achieved by the action units, to achieve a behavior of the vehicle consistent with activating said action units, wherein the behavior detecting means includes means for detecting the behavior of the vehicle through vehicle deceleration, vehicle speed and a throttle opening of one of the prime movers.

* * * * *

UNITED STATES PATENT AND TRADEMARK OFFICE
CERTIFICATE OF CORRECTION

PATENT NO.    : 6,540,035 B2
DATED         : April 1, 2003
INVENTOR(S)   : Nagano et al.

It is certified that error appears in the above-identified patent and that said Letters Patent is hereby corrected as shown below:

<u>Title page,</u>
Item [45], and the [*] Notice, information should read as follows:
-- [45] **Date of Patent: *Apr. 1, 2003** --
-- [*] Notice:    This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Fifth Day of August, 2003

JAMES E. ROGAN
*Director of the United States Patent and Trademark Office*